Dec. 16, 1969 P. E. MORGAN 3,483,582
SOLE ATTACHING WITH THERMOPLASTIC RESIN ADHESIVE
Filed Sept. 6, 1968
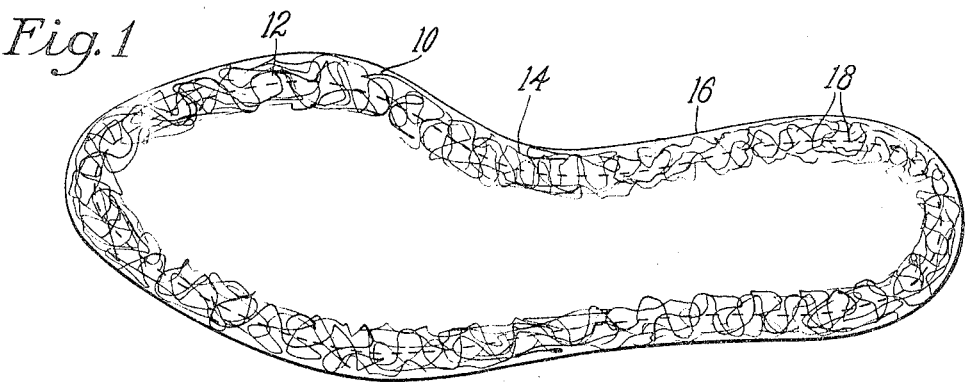
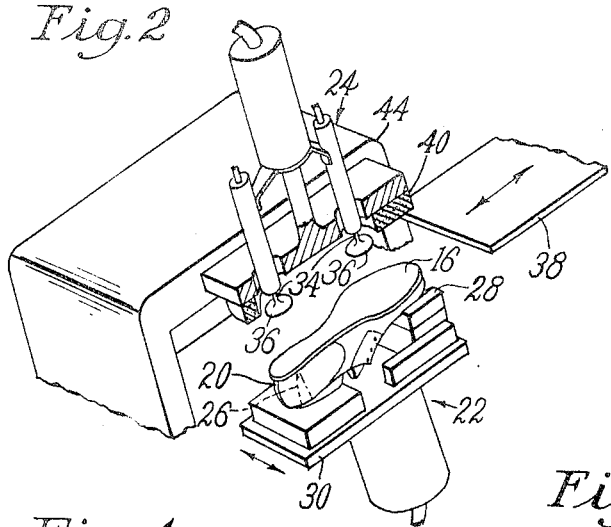
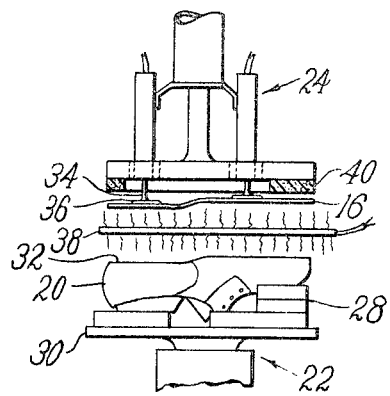
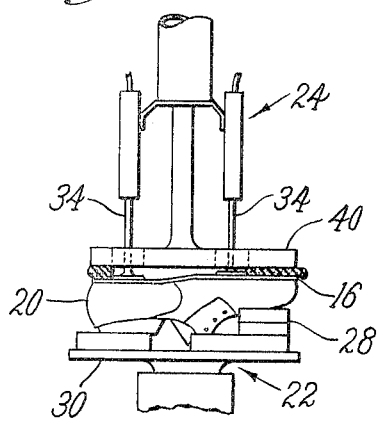
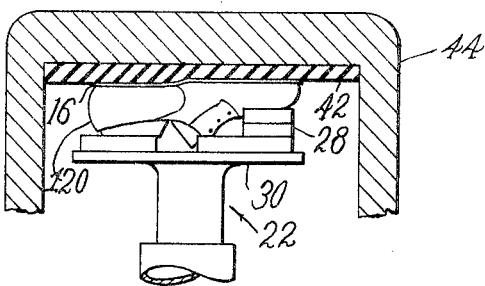
*Inventor*
Paul E. Morgan
By his Attorney
Benjamin C. Pollard

United States Patent Office 3,483,582
Patented Dec. 16, 1969

3,483,582
SOLE ATTACHING WITH THERMOPLASTIC RESIN ADHESIVE
Paul E. Morgan, Melrose, Mass., assignor to USM Corporation, Flemington, N.J., a corporation of New Jersey
Filed Sept. 6, 1968, Ser. No. 757,947
Int. Cl. A43d 11/00
U.S. Cl. 12—142                                    7 Claims

ABSTRACT OF THE DISCLOSURE

Process for adhesively attaching a tread member to a shoe comprising the steps of disposing on an attaching surface of the tread member or shoe a thin open coherent sheet of thermoplastic synthetic polymeric resin, supporting the shoe and tread member in spaced relation to and in accurate orientation with each other for movement in a guided path into attaching relationship with each other, subjecting the adhesive sheet and the attaching surfaces of the shoe and tread member to radiant heat to bring the adhesive and the attaching surfaces rapidly to sole attaching temperature, quickly bringing the surfaces together by movement along a guided path with the adhesive sheet between them, exerting pressure on the elements to force the adhesive of the sheet into intimate adhesive engagement with the attaching surfaces and cooling the assembly to establish rapidly a strong adhesive union.

---

This invention relates to a process for the adhesive attachment of tread members to shoe uppers.

In the U.S. patent application, Ser. No. 716,053, entitled "Adhesive Process and Article," filed Mar. 26, 1968 in the names of E. A. Chandler and K. W. Winslow there is disclosed a process for attaching a tread member to a shoe in which a coherent open sheet of thin interconnected strands of thermoplastic synthetic polymeric resin adhesive is applied to the attaching surface of the outsole and the outsole with the adhesive thereon and the bottom of the shoe upper are heated. The outsole and upper are assembled by the operator and inserted in the press where they are pressed together to establish an adhesive bond which provides a strong union between outsole and upper when the assembly is cooled. Excellent bonds between sole and shoe upper are obtained; but because of the very small quantity of adhesive and consequent rapid cooling of the adhesive, it has been found necessary in present procedure to heat the adhesive, the sole and the shoe upper to relatively high temperatures in order that the adhesive may still be active at the time of assembly and pressing of the sole onto the upper. Not only does this heating take substantial time; but the heat damage is caused with some shoe materials and composition soles in particular are softened to an extent causing X-raying, that is, deformation of the sole to conform to irregularities in the bottom of the shoe upper.

It is an object of the present invention to provide a rapid process for attaching tread members to shoes, using thermoplastic synthetic polymeric resin adhesive under conditions that do not cause heat damage and X-raying.

To this end and in accordance with a feature of the present invention there is provided an adhesive process for adhesively joining the attaching surfaces of tread members and shoes in which a coherent adhesive open sheet of thin interconnected strands is disposed on one of the attaching surfaces and in which short integrated timed heat activation, assembly and pressing reduce the damage of heat damage and X-raying.

The method of the present invention presents a novel coordination of a series of steps in a time pattern.

The shoe and tread member are supported in spaced relation and accurate orientation to each other and the adhesive sheet and both attaching surfaces are subjected to direct intense radiant heat for a very short time. The heated surfaces are brought together quickly by movement along a guided path and are pressed together with the adhesive sheet between them. On cooling this assembly, a strong bond is obtained.

The invention will be described further in connection with the attached drawings forming part of the disclosure of the present case in which:

FIG. 1 is a diagrammatic plan view of an outsole with a ribbon of open coherent sheet adhesive located in position to overlie the attaching margins;

FIG. 2 is a diagrammatic angular elevational view showing a lasted shoe upper and outsole in the starting position in one form of apparatus for carrying out the cycle of heating, assembly and pressing, the heating and pressing elements being in their inactive positions;

FIG. 3 is a diagrammatic partial elevational view of the shoe upper and outsole in the apparatus at the heating stage of the cycle;

FIG. 4 is a diagrammatic partial elevational view of the shoe upper and outsole in the apparatus at the assembly stage; and FIG. 5 is a diagrammatic partial elevational view of the shoe upper and outsole in the apparatus at the final pressing stage.

The present process is particularly useful for bonding tread elements to the attaching surfaces of shoe elements. Thus, the process may be used to secure outsoles to shoe bottoms, to secure heels to heel attaching surfaces either of outsoles or of shoe uppers and in other relationships. The bonding of outsoles to shoe uppers is a particularly difficult problem because of the stresses to which the bond is subjected in use, and the following description will refer to bonding of outsoles to shoe uppers. It is to be understood, however, that the process is not limited to this application of the invention.

In the attaching of outsoles to shoe uppers in accordance with the process of the present invention a thin, coherent open ribbon 10 of thin interconnected strands 12 of adhesive is disposed in position to cover the attaching surface portions 14 of an outsole 16 as shown in FIG. 1. The term "open" refers to the fact that in a given area of the ribbon 10 a substantial proportion, for example, at least about 25% and preferably 40% or more of the overall area is void. The ribbon 10 may be secured to the outsole 16 by separately applied adhesive, e.g., deposits of pressure-sensitive adhesive on the surface of the outsole, or by mechanical means or may be simply held in place during subsequent steps of the process. In a preferred form the ribbon is self-adhered to the attaching surface 14, for example, by a series of attaching points 18 to hold the ribbon 10 in place. The adhesion may be achieved by pressing a heated member against the ribbon 10 to activate it and establish adhesive engagement with the attaching surface 14. While use of a thin ribbon which covers only the attaching surface 14 of the outsole 16 is shown in the drawing, it will be understood that a sheet of interconnected adhesive strands may overlie the entire attaching surface. However, this is not preferred since the effect of adhesive at central portions of many shoe constructions is of little assistance in holding the outsole to a shoe upper.

An adhesive ribbon 10 useful in the method of the present invention may be a network of very small cross section interconnected strands such as fine fibers or filaments 12 of thermoplastic adhesive material with substantial open spaces between the elements. The fibers 12 may be in woven or nonwoven relationship. A particularly satisfactory nonwoven sheet from which ribbons 10 may be cut is formed from substantially continuous fibers laid down in crossing relationship with the fibers joined to each other at the points of intersection to form a coherent readily handled sheet. The fibers should be at least about .002" in thickness for use in attaching tread members and preferably are from about .003" to about .010" in thickness. It is important that the sheet be free from large gaps and ordinarily the gaps bewteen fibers should not exceed 3/16" and preferably not exceed 1/8". For attaching tread members, the sheet should provide a quantity of adhesive corresponding to at least about 30 grams per square yard, preferably from 40 to 90 grams per square yard and this quantity of adhesive may be made up either as single layer or as two or more layers.

As an alternative adhesive sheet there may also be used a thin unitary open sheet of thermoplastic polymeric resin adhesive formed with openings constituting at least 25% of the overall area outlined by interconnected thin strands or substantially line contact elements, provided the total amount of adhesive is at least 30 grams and preferably 40 to 90 grams per square yard. The term "unitary open sheet" in the present specification and claims refers to a structure formed by shaping a mass or impervious sheet into a sheet with openings through processes such as molding, shaping or pressing as distinguished from the joining of separately formed fibers or filaments. Such an open sheet of adhesive may be secured to the attaching surface 14 of the outsole 16 by the same procedures useful with the adhesive fiber sheet, i.e., adhesively or mechanically. However, the unitary sheet lacks the ability to compress or stretch easily in the plane of the sheet so that it is less readily laid down in a curving path to follow the outline of the shoe than is the fiber sheet.

As the adhesive of which the sheet is formed, it is preferred to use high molecular weight thermoplastic synthetic polymer resins, for example, relatively high molecular weight polyesters, polyamides, polyesteramides, and thermoplastic polyester glycol urethanes or polyether glycol urethanes. Other normally solid thermoplastic resinous materials capable of melting to a condition for wetting and adhering to shoe upper materials and of hardening to provide a strong bond may be used. Preferred adhesives for attaching tread members may have melting points in the range of from about 80° C. to about 200° C. and will harden to a strong tough condition at a temperature of at least about 50° C.

The lasted shoe upper 20 and the outsole 16 with ribbon 10 of adhesive secured to it are carried on supports 22 and 24, one or both of which is or are movable in a predetermined path to guide the shoe and outsole into attaching relation. In the arrangement shown in FIGS. 2 through 5, the support 22 for the lasted shoe upper 20 includes a heel pin 26 and toe rest 28 carried on a laterally movable member 30. When the shoe upper 20 is mounted on its support and the sole 16 is positioned manually on the bottom 32 of the shoe with the ribbon 10 of adhesive between them, reciprocable rods 34 forming part of the support 24 and having suction devices 36 at their lower ends are operated to bring the suction devices 36 into engagement with the sole 16 and suction is applied to hold the sole to the rods. The rods 34 are next operated to move the sole 16 up in a guided path into spaced relation (see FIG. 3) and proper orientation with the shoe upper 20. The sole 16 can be brought rapidly into attaching relation by later reverse movement of the rods. In an alternative arrangement (not shown) the supports may be the pressure members of a sole attaching press in which the last carrying the shoe is mounted on the heel pin with the toe on the toe rest, and the sole is held on the pad by suitable means such as vacuum. Other devices may be used to support the shoe and sole for movement in a guided path and other means than vacuum may be used to hold the sole. The vacuum arrangement may involve spaced holes in the surface of the pad connected to a vacuum manifold. However, the presence of the holes may in some instances cause marking of the sole in the course of pressing.

With the shoe upper 20 and sole 16 in spaced oriented relation, an intense radiant heat source 38 is moved between the shoe upper and sole. The radiant heat source which may be, for example, a bank of quartz tube infrared heating elements is mounted for operation to be moved between the sole 16 and shoe upper 20 and to be moved quickly out from between them. Desirably the space between the heat source 38 and the surfaces of sole and shoe upper is only about 3/4 to 1 3/4 inch for most rapid heating. Because of the extremely open nature of the adhesive ribbon 10, both the adhesive of the ribbon and a major portion of the attaching surfaces of both shoe upper and sole are exposed to direct radiant heat so that they are brought to sole attaching temperatures very rapidly.

Promptly on reaching sole attaching temperature, the heat source 38 is moved from between the sole 16 and shoe upper 20 and the rods 34 are moved down quickly to bring the sole into attaching relation to the shoe (see FIG. 4). At this point light pressure of the order of about 1/2 to about 5 pounds per square inch may be applied around the periphery of the sole as by pressing down the marginal portions of the sole by the pressure member 40 to create sufficient bond to hold the sole in position on the shoe upper. It is preferred to apply the pressure within 1 second after the heating is terminated.

Directly thereafter, the vacuum is discharged, the rods 34 and pressure member 40 are moved up out of the engagement with the sole and the laterally movable member 30 carrying the lasted shoe 20 with the sole 16 held thereon is moved under a press pad 42 mounted on a housing 44. On reaching position under the press pad 42, the member 30 with the shoe upper 20 and sole 16 carried thereon is moved up to exert final sole attaching pressure to complete the bond between the sole 16 and the shoe upper 20 (see FIG. 5). It is preferred that this final attaching pressure be applied within about 5 seconds after the heating is terminated. Final attaching pressure may be from about 80 to about 120 pounds per square inch.

It should be pointed out that the system in which the sole is supported independently of the press pad offers the advantage that the sole attaching press pad 42 is not exposed to heating. Heat damage to the press pad 42 is avoided and the temperature of the press pad 42 is not raised so that contact of the outsole 16 with the press pad 42 does not delay, and may even speed, cooling of the adhesive to a temperature at which it will hold the sole on the shoe so that in-press time of the shoe may be a minimum. Also the feature of an intermediate light pressure step followed later by the full sole attaching pressure step results in the sole 16 being held close to the bottom of the shoe upper 20 so that loss of heat is minimized. At the same time since the first pressure is light, it has only minimum tendency to permanently deform the shoe sole 16 while the shoe sole has its greatest quantity of heat.

The interdependence and cooperation of the steps of the process may be summarized as follows. The open ribbon or sheet of adhesive employs much less adhesive to establish a strong bond than formerly required. Less heat is needed to activates the adhesive since the quantity is smaller. In fact the heat applied would be insufficient to activate the heavy deposits of adhesive formed where the adhesive is applied to a sole in liquid, e.g. molten state. The surface on which the adhesive ribbon or sheet is placed is heated effectively at the same time that the adhesive is heated because of the openness of the ribbon or sheet. A short, less than six seconds, intense heating, sufficient to activate the small quantity of adhesive, brings the surface only of a shoe sole to the desired high temperature since the heating time is too short for penetration of heat into the body of material. A shoe sole even a relatively thin rubber or synthetic rubber base shoe sole, largely retains its stiffness and body under these conditions so that it is not deformed and does not develop an X-ray contour when pressed against a shoe bottom. The total quantity of heat supplied to activate the adhesive and bring the surface only to the desired temperature is much less than required with previous adhesives and, therefore, the adhesive and surfaces will cool quicker and the open time within which adhesive is still flowable under pressure and the attaching bond must be completed is much less than previously available. Assembly and pressing of the sole and upper within this very short time is obtainable as a practical matter only by pre-orienting the sole and shoe upper and bringing them together along a guided path. Thus, each step depends on each of the others and cooperates in a new way to obtain the advantages of time, cost and quality of product.

The following example is given as of assistance in understanding the invention. It is to be understood the invention is not limited to the particular procedures, materials or conditions employed in the example.

EXAMPLE

A crystallizable copolyester resin from condensation and polymerization of a 5.0:4.1:0.9 mol ratio mixture of terephthalic acid, isophthalic acid and dibutyl sebacate with 1,4 butane diol having a melting point of about 280° F. was melted and extruded from a plurality of spinnerettes as filaments about .009 inch in diameter. The filaments were deposited on a moving carrier in crossing relationship to form a web with the filaments adhered to each other at crossing points. The rate of extrusion and the speed of the carrier were correlated so that the web had a weight per square yard of about 30 grams and an openness such that in excess of 50% of the area of the web was void. On cooling, the web was slit to form ribbons of about one inch in width.

The attaching surfaces of a commercial butadiene-styrene copolymer based composition outsole were given a primer coat of a solution of neoprene and chlorinated rubber in a volatile organic solvent and dried. A composite of three thicknesses of the ribbon of the web providing about 90 grams of adhesive per square yard were secured in position to overlie the attaching surfaces of the outsole using a heated tool to fuse and self-adhere the adhesive of the web to the surface of the outsole at spaced points.

A lasted shoe upper was positioned on the heel pin and toe support of the laterally movable member of the attaching arrangement and the outsole was then located manually on the shoe bottom. The reciprocable rods were operated to bring the suction devices into engagement with the sole, suction was applied and the rods were then moved up carrying the sole into spaced relation to the bottom of the shoe upper while retaining its orientation.

A heating unit comprising a series of quartz tube infrared elements with a power input of 4.5 kilowatts was then moved between the upper and the sole with a spacing of about one inch from each of the surfaces. After four seconds the heating unit was withdrawn from between the outsole and shoe bottom and the rods were activated to move the outsole into registry with the bottom of the shoe upper. Directly after this, and in less than 1 second after withdrawal of the heating unit the peripheral pressure member was brought down on the outsole with a pressure of about five pounds per square inch to establish an initial bond between the shoe upper and the outsole and the rods and pressure member were promptly moved up out of engagement with the outsole.

The carrier member with the lasted shoe upper and outsole thereon was then moved laterally to position the shoe and outsole beneath the press pad and pressure was applied to the cylinder to force the lasted upper and outsole against the press pad to establish sole attaching pressure of about 120 pounds per square inch. Elapsed time between the removal of the heating unit from between the outsole and shoe upper and establishment of sole attaching pressure was about 4 seconds.

After holding the outsole pressed against the shoe upper for about 6 seconds, pressure was released and the upper with attached outsole removed from the apparatus. It was found that the outsole was strongly attached to the shoe upper. The bond strength and resistance of the bond to stresses involved in use of a shoe were satisfactory.

For purposes of comparison, the same resinous material used in forming the web was fed to a melting device where it was melted and supplied to an outsole cementer. The molten resinous material was applied in molten condition to the attaching surface of a primed outsole such as that used in connection with the ribbon of adhesive web and allowed to cool.

Where the resin band was of the normal thickness of .015 inch, the procedure described above which was capable of activating the ribbon of web adhesive was not effective to activate the band of adhesive sufficiently to establish a significant bond.

In a further test in which a very thin adhesive band of only .006 inch thickness was deposited with observance of special precautions, a bond of only one-half the strength of the adhesive web was obtained.

In each instance, the inadequate bond obtained with the band deposited from molten adhesive under these conditions was due to incomplete activation of the adresive band. It was found that effective activation of the .006 inch thick band required about 50% more heating time and that the attached sole displayed objectionable X-raying due to undesirable softening of the sole and distortion under sole attaching pressure. Activation of the outsole with a .015 inch thickness of adhesive required still more heating time and gave even greater X-raying.

Having thus described my invention, what I claim as new and desire to secure by Letters Patent of the United States is:

I claim:

1. The process of joining adhesively the attaching surface of the bottom of a shoe upper and the attaching surface of a tread member comprising the steps of disposing on one of the surfaces to be joined a coherent sheet of thin strands of thermoplastic synthetic polymeric resin adhesive, supporting said shoe upper and tread member in spaced relation to and in accurate orientation with each other for movement in a guided path into attaching relation with each other, subjecting the attaching surfaces of both tread member and shoe bottom and the sheet of adhesive strands to radiant heat to bring said surfaces and adhesive rapidly to sole attaching temperature, bringing said tread member and shoe bottom together by movement along said guided path with said sheet of adhesive strands between them, applying pressure to force the adhesive of the sheet into intimate engagement with said surfaces and cooling said assembly to establish rapidly a strong adhesive union between the surfaces.

2. The process of joining adhesively the attaching surface of the bottom of a shoe upper and the attaching surface of a tread member as defined in claim 1 in which said sheet of adhesive is secured to one of said surfaces before heating and in which said sheet is formed of interconnected thin strands outlining openings and having an open area at least about 25% of the overall area of said sheet.

3. A process of joining adhesively the attaching surface of a bottom of a shoe upper and the attaching surface of a tread member as defined in claim 2 in which said adhesive sheet provides a quantity of adhesive of at least about 30 grams per square yard and said sheet is a web of fibers of said adhesive, said fibers being adhered in crossing relation to each other to constitute a coherent open sheet.

4. The process of joining adhesively the attaching surface of the bottom of a shoe upper and the attaching surface of a tread member as defined in claim 3 in which said tread member is located accurately on the attaching surface of the shoe upper, and thereafter the tread member and shoe uppper are moved into said spaced relation along a guided path while maintaining said accurate orientation.

5. The process of joining adhesively the attaching surface of a bottom of a shoe upper and the attaching surface of a tread member as defined in claim 4 in which said tread member is an outsole of a natural or synthetic rubber composition, said adhesive sheet is self-adhered to one of said surfaces by applying heat and pressure to force portions of said sheet into adhesive engagement with said surface and in which said radiant heating has an intensity to bring said surfaces and adhesive to sole attaching temperature in less than about six seconds.

6. The process of joining adhesively the attaching surface of a bottom of a shoe upper and the attaching surface of a tread member as defined in claim 5 in which said tread member is lightly pressed against said shoe bottom directly after heating to establish sufficient bond to hold said tread member in place and thereafter the tread member is pressed against said shoe bottom with sufficient force to bring the adhesive of the sheet into intimate strongly bonding engagement with said surfaces.

7. The process of joining adhesively the attaching surface of the bottom of a shoe upper and the attaching surface of a tread member as defined in claim 6 in which said light pressing is from about ½ to about 5 pounds per square inch, said final pressing is from about 80 to about 120 pounds per square inch and in which the time from the end of the heating step to application of the final pressure is less than about 5 seconds.

References Cited

UNITED STATES PATENTS

| | | | |
|---|---|---|---|
| 3,247,536 | 4/1966 | Rossitto et al. | 12—142 |
| 3,278,960 | 10/1966 | Nardone | 12—142 |
| 3,359,585 | 12/1967 | Woodman | 12—142 |

PATRICK D. LAWSON, Primary Examiner